United States Patent
Halle et al.

(10) Patent No.: US 11,535,404 B2
(45) Date of Patent: Dec. 27, 2022

(54) ATTITUDE CONTROL DEVICE FOR A SATELLITE AND METHOD FOR CONTROLLING THE ATTITUDE OF A SATELLITE

(71) Applicant: DEUTSCHES ZENTRUM FUER LUFT- UND RAUMFAHRT E.V., Cologne (DE)

(72) Inventors: Winfried Halle, Berlin (DE); Thomas Terzibaschian, Berlin (DE); Christian Raschke, Schulzendorf (DE); Wolfgang Baerwald, Berlin (DE); Xavier Amiques, Berlin (DE); Andreas Kotz, Petershagen (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 271 days.

(21) Appl. No.: 16/506,071

(22) Filed: Jul. 9, 2019

(65) Prior Publication Data
US 2020/0010222 A1    Jan. 9, 2020

(30) Foreign Application Priority Data
Jul. 9, 2018    (DE) .................... 10 2018 211 292.4

(51) Int. Cl.
| | | |
|---|---|---|
| B64G 1/28 | (2006.01) | |
| G05D 1/00 | (2006.01) | |
| B64G 1/24 | (2006.01) | |
| G06T 7/70 | (2017.01) | |
| B64G 1/36 | (2006.01) | |

(52) U.S. Cl.
CPC ............ B64G 1/244 (2019.05); B64G 1/285 (2013.01); B64G 1/288 (2013.01); B64G 1/36 (2013.01); G05D 1/0066 (2013.01); G06T 7/70 (2017.01)

(58) Field of Classification Search
CPC ........ G05D 1/0066; B64G 1/288; B64G 1/36; B64G 1/283; B64G 1/285; B64G 1/244; G06T 7/70
See application file for complete search history.

(56) References Cited

U.S. PATENT DOCUMENTS 4,662,178 A * 5/1987 Rasmusson ............... B64G 1/38
                                                   244/165
4,732,353 A * 3/1988 Studer ...................... H02K 7/09
                                                   244/165
(Continued)

OTHER PUBLICATIONS

Ross; "A review of pseudospectral optimal control: From theory to flight"; Annual Reviews in Control 36; 2012; pp. 182-197 (Year: 2012).*

(Continued)

*Primary Examiner* — Stephen Holwerda
(74) *Attorney, Agent, or Firm* — Laurence A. Greenberg; Werner H. Stemer; Ralph E. Locher

(57) ABSTRACT

An attitude control apparatus for a satellite includes: at least three electric motors, wherein the at least three electric motors are arranged in such a way that a torque may be generated with any orientation of an associated torque vector, and a controller, wherein the controller is configured to drive the at least three electric motors based on a torque controller. The torque controller is adapted to operate the at least three electric motors outside a rest state only when an acceleration torque and a braking torque are required to execute an agile attitude change maneuver. There is also described an associated method.

10 Claims, 2 Drawing Sheets

(56) References Cited

U.S. PATENT DOCUMENTS

| | | | | |
|---|---|---|---|---|
| 5,474,263 | A | * | 12/1995 | Ford .................. G01C 19/26 244/165 |
| 8,880,246 | B1 | * | 11/2014 | Karpenko ............. B64G 1/288 701/13 |
| 2005/0125111 | A1 | * | 6/2005 | Bonn .................. B64G 1/244 701/4 |
| 2011/0006162 | A1 | | 1/2011 | Sperandei |
| 2012/0199697 | A1 | | 8/2012 | Nagabhushan et al. |
| 2016/0355279 | A1 | | 12/2016 | Lim et al. |

OTHER PUBLICATIONS

Paul Acquatella B.; Fast Slew Maneuvers for the High-Torque-Wheels BIROS Satellite*; The Japan Society for Aeronautical and Space Sciences; 2018; pp. 79-86; vol. 61, No. 2.

Astro- und Feinwerktechnik Adlershof GmbH, Berlin: "Produkte / Raumfahrt" [Space Travel] Web page archived on Jun. 26, 2018 (according to Internet Archive, San Francisco, CA, U.S.A.), URL:https://web.archive.org/eb/20180626035103/http://www.astrofein.com./astro-und-feinwerktechnik-adlershof/produkte/raumfahrt/ [retrieved on Jun. 19, 2019]—English version.

Raschke, Christian: Drehmomentgeber zur hoch agilen Lageregelung von optischen Fernerkundungssatelliten. Köln: Deutsches Zentrum für Luft- und Raumfahrt, 2018, (technical report; 2018-26). Front page + index of contents + pp. 67-71 + pp. 102-108. At the same time: Berlin, Techn. Univ., dissertation, 2018; date of the defense:Apr. 12, 2018 Statement of Relevance.

Raschke, Christian: Drehmomentgeber zur hoch agilen Lageregelung von optischen Fernerkundungssatelliten. Köln: Deutsches Zentrum für Luft- und Raumfahrt, 2018, (technical report; 2018-26). Front page + index of contents + pp. 114-116. At the same time: Berlin, Techn. Univ., dissertation, Fak. V; 2018; date of the defense:Apr. 12, 2018 Statement of Relevance.

* cited by examiner

ATTITUDE CONTROL DEVICE FOR A SATELLITE AND METHOD FOR CONTROLLING THE ATTITUDE OF A SATELLITE

BACKGROUND OF THE INVENTION

Field of the Invention

The invention relates to an attitude control apparatus for a satellite and a method for controlling the attitude of a satellite.

Due to ongoing development in the remote sensing technology field, particularly with regard to higher-resolution and smaller detection ranges, current mission scenarios provide for acquiring a plurality of images within a single overflight of a satellite over an area. In particular, it is planned to cover wider swaths and/or acquire a plurality of targets. Consequently, satellites must for example be rotated by up to 30 degrees within 10 seconds.

Such agile attitude change maneuvers (rotation rates of >1 degree per second) require torques greater than the torques necessary, for example, to compensate an orbital rotation rate (e.g. a permanent nadir orientation of the satellite), to compensate for the Earth's orbital motion around the Sun, or for rotations between different primary orientations (e.g. to redirect the satellite's solar cells back toward the Sun). Typically, for these normal attitude change maneuvers that have rotation rates of <1 degree per second, reaction wheels, engines or magnetic torquers are used.

There are currently only two solutions available for executing agile attitude change maneuvers: tethered gyroscopes (Control Momentum Gyroscope, CMG) or engines.

A tethered gyroscope is a gyroscope that rotates rapidly in a gimbal, in which the frame axes are not freely suspended and an axis may instead be forced in a certain direction. Such a CMG therefore stores kinetic energy and angular momentum in a moving oscillating mass. If the axis that is not freely movable axis in one direction, a torque is generated, and the satellite is rotated due to the conservation of angular momentum. To compensate for internal disturbances of the CMG, an internal controller must run continuously and power losses (for example due to friction) must be compensated for continuously.

The constantly-stored angular momentum may also be a source of vibrations and may trigger control oscillations as a result of nonlinear coupling with the desired satellite movements. Both effects may lead to "motion blurring" of the acquired sensor data, in the case of high-resolution optical detection.

An attitude control apparatus and attitude control method for satellites is described in an article by the applicant: *Fast Slew Maneuvers for the High-Torque-Wheels BIROS Satellite*, Paul Acquatella, Trans. Japan Soc. Aero. Space Sci., Vol. 61, No. 2, pp. 79-86, 2018. The publication is herewith incorporated by reference.

Engines generate a torque by aligning the thrust vector with a distance to the satellite's center of gravity. The obvious drawback of using engines, however, is that the satellite may store only limited quantities of the fuel used to generate thrust. Due to the loss of mass that accompanies the generation of thrust, there is also a constant change in the attitude of the center of gravity and in the moments of inertia. This may likewise influence an orientation of the satellite.

BRIEF SUMMARY OF THE INVENTION

The object of the invention is to create a satellite attitude control apparatus and a satellite attitude control method, in which the execution of agile attitude change maneuvers may be improved.

This technical problem is solved according to the invention by an attitude control apparatus as claimed and a method with the features as claimed. Advantageous configurations of the invention are presented in the dependent claims.

In particular, an attitude control apparatus for a satellite is provided that comprises at least three electric motors, with these three electric motors being arranged such that a torque may be generated with any orientation of an associated torque vector. The attitude control apparatus further comprises a controller, the controller being adapted to control the at least three electric motors based on a torque controller, and wherein the torque controller is adapted to operate the at least three electric motors outside a rest state only when an acceleration torque and a braking torque are required in order to execute an agile attitude change maneuver.

A satellite attitude control method is also provided, wherein the satellite comprises an attitude control apparatus with at least three electric motors and a controller, wherein the at least three electric motors may be arranged to generate a torque for any orientation of an associated torque vector, and wherein the controller is arranged to drive the at least three electric motors based on a torque controller, and wherein the torque controller is adapted to operate the at least three electric motors outside a rest state only when an acceleration torque and a braking torque are required in order to execute an agile attitude change maneuver, comprising the following steps: receiving a target orientation of the satellite, calculating an acceleration torque and a braking torque based on a comparison between the received target orientation and an actual orientation of the satellite by means of the controller, and generating the calculated acceleration torque and the calculated braking torque by driving the at least three electric motors by means of the controller.

A fundamental idea of the invention is for a torque controller to drive at least three electric motors in order to execute an agile attitude change maneuver. In this case, the electric motors are only energized from a rest state, i.e. a resting state of the rotor, if an acceleration and braking torque is required to execute the agile attitude change maneuver. As a result, the electric motors may remain in a rest state most of the time. If an agile attitude change maneuver is required, a target orientation is transmitted to the controller, for example from a central controller of the satellite. From the target orientation and an actual orientation, which for example is likewise transmitted from the central controller of the satellite to the controller, the controller calculates a required acceleration and braking torque based on a comparison between the received target orientation and the received actual orientation of the satellite. An acceleration torque and a braking torque in this case should in particular be torques that are generated over a specified time interval. In particular, the acceleration torque may be a torque that increases over the time interval. In particular, the braking torque may be a torque that decreases over the time interval. The controller then drives the at least three electric motors in such a way that they generate the calculated acceleration torque and the calculated braking torque, thus moving the satellite from its actual orientation to its target orientation. In this case it may be envisioned that a current actual orientation of the satellite is continuously checked while the attitude change maneuver is being executed.

The advantage of the invention is that vibrations that occur in CMGs due to the continuous operation of the gyroscope may be prevented, because the at least three electric motors remain in the rest state most of the time. In addition, energy may be saved because the at least three electric motors are not permanently in operation and do not have to be kept moving.

These at least three electric motors are designed in such a way that they are able to provide sufficiently large torques for agile attitude change maneuvers. This is done by adjusting the moment of inertia, torque or power of the electric motors for a mass or moment of inertia of the satellite in which the attitude control apparatus will be placed. In particular, in this case, the controller is designed in such a way that it may be flexibly adapted to different electric motors or properties of the satellite, for example by setting the corresponding control parameters and storing them in a memory. In this way, the controller may be used as part of a modular approach in which similarly manufactured controllers may be adapted to a respective application scenario, as needed, flexibly and without great expense.

In one embodiment it is envisioned that the at least three electric motors respectively have a flywheel, and the flywheels are mechanically coupled to a rotor of the electric motors. In this way, a moment of inertia of the at least three electric motors may respectively be changed, and in particular increased. This may be used to flexibly design the at least three electric motors for an appropriate application scenario, for example to take into account a greater mass or greater moment of inertia of a satellite.

In one embodiment, it is envisioned that the at least three electric motors may generate a torque of at least 0.09 newton-meters per kilogram net mass, preferably at least 0.45 newton-meters per kilogram net mass. These ratios are particularly advantageous, because in satellites, mass and as a result also launch costs may be saved, notwithstanding the high available torques.

In an additional embodiment, it is envisioned that the attitude control apparatus has at least one additional electric motor. The resulting at least four electric motors are arranged in a tetrahedral arrangement such that even if one of the electric motors fails, a torque at any orientation of an associated torque vector may be generated with the respectively remaining three of the at least four electric motors. The advantage is that by means of the tetrahedral arrangement, a redundancy may be created by just one additional electric motor, which makes it possible to continue rotating the satellite in any orientation even if one of the electric motors fails. Of course, the attitude control apparatus may also comprise more than four electric motors, in order to further increase the satellite's resilience against failure.

In an additional embodiment it is envisioned that the attitude control apparatus additionally comprises at least one tethered gyroscope (Control Moment Gyroscope), wherein the controller is further designed to additionally drive the at least one tethered gyroscope. This allows the controller to be optimized for joint operation of the tethered gyroscope and at least three electric motors for agile attitude change maneuvers.

In another embodiment, it is envisioned that the controller is further designed to also control the at least three electric motors for executing a normal attitude change maneuver of the satellite. This means, for example, that the CMGs may be wholly omitted. As a result, energy efficiency may be further increased, and vibrations the CMGs cause may be entirely eliminated In order to execute normal attitude change maneuvers, the controller always brings the at least three electric motors from a rest state to a calculated torque. However, it may also be envisioned that the apparatus is used in addition to the CMGs. This allows redundancy, because both the CMGs and the apparatus are able to execute normal satellite attitude change maneuvers. This may increase resilience against failure.

In a further embodiment, it is envisioned that the attitude control apparatus is so designed as to at least partially recover energy that has been converted in order to apply the torque. This has two advantages: first, energy efficiency may be further increased, because not all the energy required to apply the torque is converted into heat after the attitude change maneuver has been completed, but is instead recovered; and second, heating of the satellite resulting from dissipation of the energy may be reduced, so that costly cooling processes may be avoided.

In another embodiment it is envisioned that the at least three electric motors have an interlock, the interlock being so designed that the at least three electric motors are independently capable of irreversibly releasing this interlock by applying a corresponding torque. Such an interlock may for example consist in a rotor of the electric motor being fixed to the stator by a connecting element. Such a connecting element could, for example, be in the form of a tightly-locking material bridge. Because the rotor of the electric motor is fixed via the connecting element, the bearings of the rotor of the electric motor may be preserved at satellite launch. After the rocket launch and the launch of the satellite into space, the interlock is irreversibly released by applying a corresponding torque by means of the electric motors, for example by irreversibly destroying the connecting element. The rotor of the electric motor may then move freely and the interlock is released. The advantage is that the bearings of the rotor of the electric motor may be designed less robustly and therefore may be smaller and more material-saving, because they are no longer mechanically stressed, or at least not so strongly, during the launch of the satellite and the accompanying acceleration.

In one embodiment it is envisioned that the torque is controlled based on a torque characteristic curve. The torque characteristic curve indicates how a speed is linked to a torque. The torque characteristic curve that pertains to the at least three electric motors may, for example, be stored in a memory of the controller. By means of such a torque characteristic curve, a torque that this electric motor generates may be inferred from a measured rotation speed of the electric motor. The rotation speed may be ascertained, for example, by means of an encoder disc arranged on the rotor of the electric motor. The controller may then control or govern the torques of the electric motors based on the ascertained speeds and the torque characteristic curve.

BRIEF DESCRIPTION OF THE SEVERAL VIEWS OF THE DRAWING

In the following, the invention is explained in greater detail by means of preferred exemplary embodiments, with reference to the drawings. These drawings show the following.

DESCRIPTION OF THE INVENTION

Figure 1:
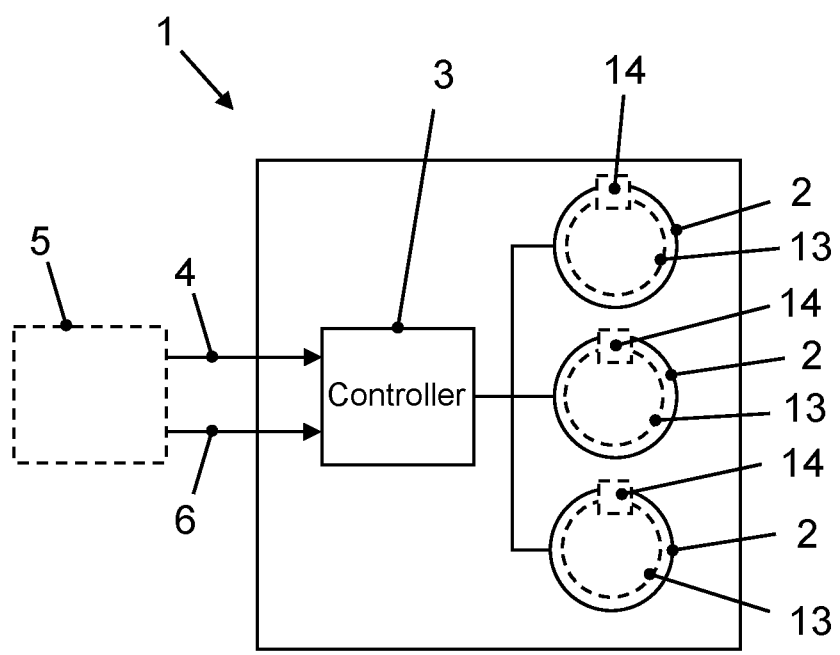
FIG. 1 a schematic representation of an embodiment of the attitude control apparatus for a satellite.

FIG. 1 shows a schematic representation of an embodiment of the attitude control apparatus 1 for a satellite; The attitude control apparatus 1 comprises three electric motors 2 and a controller 3. The arrangement of the three electric motors 2 is shown only schematically in the drawing; in the application scenario in the satellite, the three electric motors 2 are arranged along the three spatial directions with respect to their rotational axis, so that a torque with an associated torque vector may respectively be generated along each of these spatial directions. The controller 3 controls or regulates the three electric motors 2 based on a torque controller. The torque controller is designed to operate the three electric motors 2 outside a rest state only if an acceleration and braking torque is required in order to execute an agile attitude change maneuver.

If an agile attitude change maneuver is required, a target orientation 4 of the satellite is transmitted to the controller 3, for example from a central controller 5 of the satellite. In addition, an actual orientation 6 of the satellite is transmitted to the controller 3, for example likewise from the central controller 5 of the satellite. Based on a comparison between the received target orientation 4 and the received actual orientation 6, the controller 3 calculates a torque in the form of an acceleration and braking torque.

The calculated acceleration and braking torque is then generated by driving the three electric motors 2.

It may be envisioned that the three electric motors 2 each have a flywheel 13, and the flywheels 13 are respectively mechanically coupled with a rotor of the electric motors 2. In this way it is achieved that a moment of inertia of the moving part of the motors may be changed or set based on an application scenario.

It may also be envisioned that the attitude control apparatus 1 comprises a further electric motor 2, these four electric motors 2 being arranged in a tetrahedral arrangement, so that even in the event of failure of one of the electric motors 2 with the three remaining electric motors 2, a torque may be generated for any orientation of an associated torque vector.

It may also be envisioned that the at least three electric motors 2 have an interlock 14. The interlock 14 is designed in such a way that the three electric motors 2 are independently capable of irreversibly releasing this interlock 14 by applying a corresponding torque.

Figure 2:
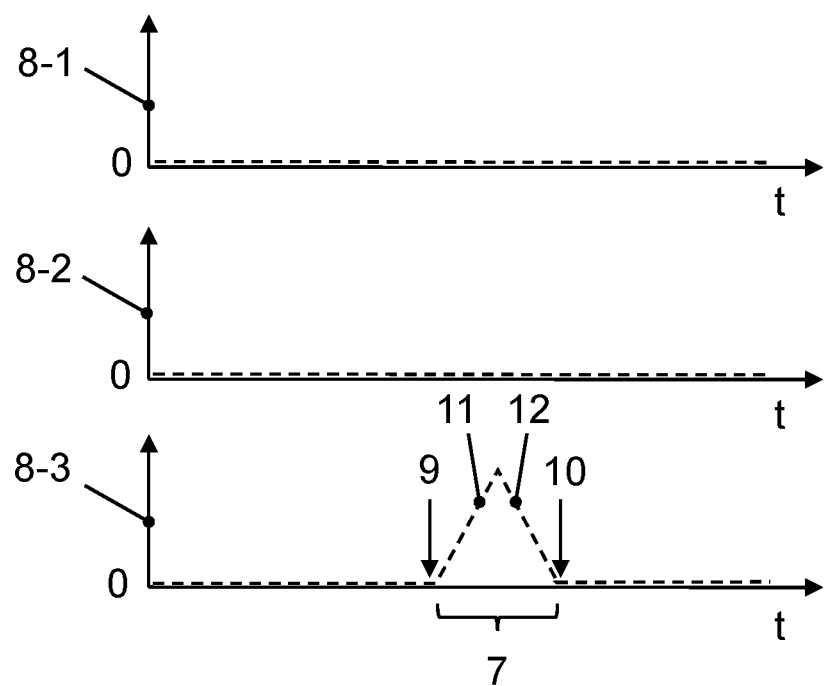
FIG. 2 a schematic representation of the time progression of the torques during an attitude change maneuver FIG. 3 a schematic flow chart of an embodiment of the method of controlling the attitude of a satellite.

FIG. 2 shows a schematic time progression of an attitude change maneuver 7. The applied torque 8-1, 8-2, 8-3 from a respective electric motor is respectively shown on the Y axis. In this simple example, it is assumed that in order to execute the attitude change maneuver 7, it is only necessary to apply a torque 8-1, 8-2, 8-3 the torque vector of which coincides with a rotational axis of a rotor of one of the electric motors, in this case the electric motor the torque 8-3 of which is shown in the lower graph of FIG. 2. The attitude change maneuver 7 starts at a start time 9 and ends at an end time 10. Before and after these times 9, 10, the torque 8-1, 8-2, 8-3 of the three electric motors is respectively equal to zero. In order to execute the attitude change maneuver 7, the electric motor shown in the lower part is driven in such a way that an acceleration torque 11 and then a braking torque 12 is generated using this electric motor. By means of the torque 8-3 generated in the form of the acceleration torque 11 and the braking torque 12, an orientation of the satellite is changed.

If, during an attitude change maneuver 7, the torque vector of the necessary torque 8-1, 8-2, 8-3 does not coincide with one of the rotational axes of the rotors of the electric motors, torques must also be respectively applied from the other electric motors in order to achieve a corresponding orientation of the torque vector of the torque to be applied.

Figure 3:
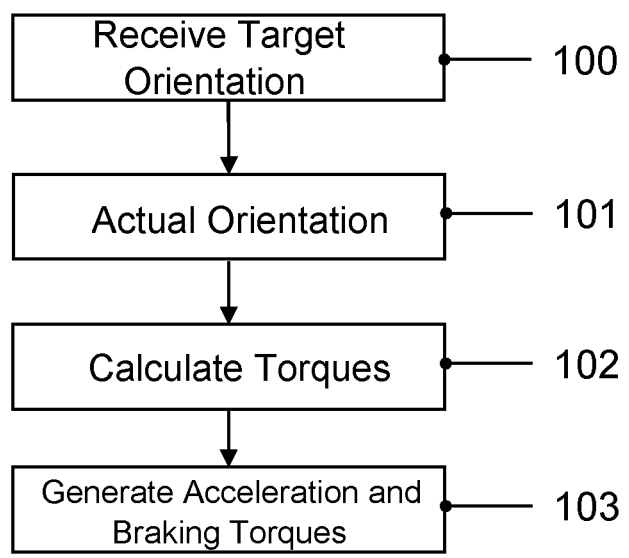

FIG. 3 shows a schematic flow chart of an embodiment of the method for attitude control of a satellite. The satellite has an attitude control apparatus with at least three electric motors and a controller. The at least three electric motors are arranged in such a way that a torque may be generated for any orientation of an associated torque vector. The controller of the attitude control apparatus is designed in such a way that the at least three electric motors are driven based on a torque controller. The torque controller is designed to operate the at least three electric motors outside a rest state only when an acceleration and braking torque is required on order to execute an agile attitude change maneuver.

In a first step 100, the controller receives a target orientation of the satellite. The target orientation may, for example, be provided by a central controller of the satellite. In a step 101, the controller receives an actual orientation of the satellite. This actual orientation of the satellite may, for example, likewise be provided by the central controller of the satellite and then transmitted to the controller.

In a step 102, by means of the controller, an acceleration and braking torque is calculated based on a comparison between the received target orientation and the received actual orientation of the satellite.

In a step 103, the calculated acceleration and braking torque is generated by driving the at least three electric motors. For this purpose, the controller drives the at least three electric motors via the torque controller so that the torques that the torques that the at least three electric motors respectively generate will interact to yield the calculated acceleration and braking torque and the actual orientation of the satellite will change to the target orientation in accordance with the attitude change maneuver.

LIST OF REFERENCE SIGNS

1 Attitude control apparatus
2 Electric motor
3 Controller
4 Target orientation
5 Central controller
6 Actual orientation
7 Agile attitude change maneuver
8-1 Torque
8-2 Torque
8-3 Torque
9 Start time
10 End time
11 Acceleration torque
12 Braking torque
13 Flywheel
14 Interlock
100-103 Steps

The invention claimed is:

1. An attitude control apparatus for a satellite, the attitude control apparatus comprising:
   at least three electric motors arranged to enable a torque to be generated with any orientation of an associated torque vector, and said at least three electric motors being configured to generate at least a torque of 0.09 newton-meters per kilogram of net mass;
a controller configured to drive said at least three electric motors based on a torque control; and
wherein the torque control of said controller is configured to
operate said at least three electric motors in a rest state where rotors of said at least three electric motors do not rotate; and
operate said at least three electric motors outside the rest state only when an acceleration torque and a braking torque are required in order to execute an agile attitude change maneuver, wherein the agile attitude change maneuver has a rotation rate of greater than 1 degree per second.

2. The attitude control apparatus according to claim 1, wherein each of said at least three electric motors has a flywheel mechanically coupled to a rotor of the respective said electric motor.

3. The attitude control apparatus according to claim 1, wherein said at least three electric motors are configured to generate at least a torque of 0.45 newton-meters per kilogram of net mass.

4. The attitude control apparatus according to claim 1, wherein said at least three electric motors include at least one fourth electric motor, wherein said at least four electric motors are arranged in a tetrahedral arrangement such that, even if one of said electric motors fails, a torque at any orientation of an associated torque vector may be generated with the respectively remaining three electric motors.

5. The attitude control apparatus according to claim 1, further comprising at least one tethered gyroscope, and wherein said controller is further configured to additionally drive said at least one tethered gyroscope.

6. The attitude control apparatus according to claim 1, wherein said controller is further configured to drive said at least three electric motors so as to execute a normal attitude change maneuver of the satellite.

7. The attitude control apparatus according to claim 1, configured to at least partially recover energy that has been converted in order to apply the torque.

8. The attitude control apparatus according to claim 1, wherein said at least three electric motors have an interlock, said interlock being configured to enable said at least three electric motors to independently and irreversibly release the interlock by applying a corresponding torque.

9. The attitude control apparatus according to claim 1, wherein said controller is configured to control the torque based on a torque characteristic curve.

10. An attitude control method for a satellite, the satellite having an attitude control apparatus with at least three electric motors and a controller, wherein the at least three electric motors are arranged in such a way that a torque may be generated with any orientation of an associated torque vector, and the at least three electric motors being configured to generate at least a torque of 0.09 newton-meters per kilogram of net mass, wherein the controller is configured to drive the at least three electric motors based on a torque controller, and wherein the torque controller is configured to operate said at least three electric motors in a rest state where rotors of said at least three electric motors do not rotate and to operate the at least three electric motors outside the rest state only when an acceleration torque and a braking torque are required in order to execute an agile attitude change maneuver, wherein the agile attitude change maneuver has a rotation rate of greater than 1 degree per second, the method comprising the following steps:
receiving a target orientation of the satellite;
calculating with the controller an acceleration torque and a braking torque based on a comparison between the target orientation and an actual orientation of the satellite; and
generating the calculated acceleration torque and the calculated braking torque by driving the at least three electric motors with the controller.

* * * * *